(12) United States Patent
Simonelli et al.

(10) Patent No.: US 10,889,952 B2
(45) Date of Patent: Jan. 12, 2021

(54) BAR SCREEN FILTER APPARATUS AND METHOD

(71) Applicant: PARKSON CORPORATION, Fort Lauderdale, FL (US)

(72) Inventors: James K. Simonelli, Orlando, FL (US); Walter B. Stanek, Memphis, TN (US)

(*) Notice: Subject to any disclaimer, the term of this patent is extended or adjusted under 35 U.S.C. 154(b) by 0 days.

(21) Appl. No.: 16/610,580

(22) PCT Filed: Jun. 1, 2018

(86) PCT No.: PCT/US2018/035590
§ 371 (c)(1),
(2) Date: Nov. 4, 2019

(87) PCT Pub. No.: WO2018/222985
PCT Pub. Date: Dec. 6, 2018

(65) Prior Publication Data
US 2020/0149239 A1    May 14, 2020

Related U.S. Application Data

(60) Provisional application No. 62/513,515, filed on Jun. 1, 2017.

(51) Int. Cl.
*E02B 8/02* (2006.01)
*B01D 29/44* (2006.01)
(Continued)

(52) U.S. Cl.
CPC ............ *E02B 8/026* (2013.01); *B01D 29/445* (2013.01); *B01D 29/6484* (2013.01); *E03F 5/14* (2013.01);
(Continued)

(58) Field of Classification Search
CPC .... E03F 5/14; E02B 8/02; E02B 8/023; E02B 8/026; B01D 29/03; B01D 29/445; B01D 29/6484; B01D 2029/033
(Continued)

(56) References Cited

U.S. PATENT DOCUMENTS 1,984,891 A * 12/1934 Miick ..................... E02B 8/026
                                                                210/159
2,671,563 A *  3/1954 Benner, Jr. ............. E02B 8/026
                                                                210/159
(Continued)

*Primary Examiner* — Christopher Upton
(74) *Attorney, Agent, or Firm* — Tarolli, Sundheim, Covell & Tummino LLP

(57) ABSTRACT

Apparatus for removing debris from channeled water that includes a bar screen assembly. The assembly includes a plurality of spaced apart screen bars, each bar having an upstream edge and a downstream edge and distal ends to which U-shaped clips are attached. Each of the clips has a bar engaging portion and a cross member engaging portion that attaches to an associated cross member. The clips operate to space the trailing edge of the screen bars a predetermined distance from associated cross members and allow easy replacement of a bar. A continuous conveyor carries a plurality of rakes having a plurality of spaced apart tines which are adapted to fit between the screen bars as the rake is moved along the bars by the conveyor. The tines of the rake have a length that substantially spans the distance between the leading edge and trailing edge of a bar, so that tips of the rake tines extend to at least the trailing edge of an associated bar. Intermediate clips may be used to support the intermediate section of the screen bars.

24 Claims, 13 Drawing Sheets

(51) Int. Cl.
  B01D 29/64 (2006.01)
  E03F 5/14 (2006.01)
  B01D 29/03 (2006.01)

(52) U.S. Cl.
  CPC ........ *B01D 29/03* (2013.01); *B01D 2029/033* (2013.01)

(58) Field of Classification Search
  USPC .................................................. 210/159, 162
  See application file for complete search history.

(56) References Cited

U.S. PATENT DOCUMENTS

| | | | |
|---|---|---|---|
| 2,839,197 A * | 6/1958 | Nordell | B07B 1/48 |
| | | | 210/162 |
| 3,716,144 A * | 2/1973 | Bartlow | B01D 29/445 |
| | | | 210/499 |
| 4,184,957 A | 1/1980 | Botsch | |
| 4,780,199 A | 10/1988 | Ezzell et al. | |
| 5,534,140 A | 7/1996 | Brummond et al. | |
| 5,922,195 A * | 7/1999 | Pastore | B01D 29/445 |
| | | | 210/162 |
| 6,869,524 B1 | 3/2005 | Seidl | |
| 2003/0018563 A1 | 1/2003 | Kilgour et al. | |
| 2003/0132149 A1 | 7/2003 | Seidl | |
| 2003/0183563 A1 * | 10/2003 | Wilcher | E02B 8/026 |
| | | | 210/159 |
| 2008/0105608 A1 * | 5/2008 | Burgess | E02B 8/026 |
| | | | 210/405 |
| 2011/0068052 A1 * | 3/2011 | Zollner | B01D 29/445 |
| | | | 209/394 |
| 2011/0129630 A1 | 6/2011 | Reiss, Jr. | |
| 2016/0339367 A1 * | 11/2016 | Spenger | E03F 5/14 |

\* cited by examiner

BAR SCREEN FILTER APPARATUS AND METHOD

CROSS REFERENCES TO RELATED APPLICATIONS

This application filed under 35 U.S.C § 371 is a national phase application of International Application Serial Number PCT/US2018/035590 filed Jun. 1, 2018 which claims priority to U.S. Provisional Application 62/513,515, filed Jun. 1, 2017.

BACKGROUND OF THE INVENTION

This invention is used in the capturing of debris entrained in a liquid stream. There are two primary applications; screening wastewater from a municipal or industrial facility, and screening water intakes to a fresh water facility or industrial facility.

A bar screen consists of bars positioned in the stream spaced incrementally across a flowing liquid channel. Debris larger than the space increment is stopped by the upstream side of the bars, for later removal by other means.

Various bar profiles can be used; rectangular, trapezoidal, flatten teardrop and teardrop. Rectangular bars are the easiest to produce, but have the highest flow resistance. Trapezoidal bars tapered sides improve flow resistance, but the sharp edges on the upstream and downstream side create flow restriction, A teardrop shaped bar has the least flow resistance, as it has smooth transitions upstream and downstream edges. However, the tapered shape and smooth downstream side makes it difficult to mount bars to the support structure. It is especially difficult to mount improved flow shape bars to allow for full penetration rakes. A simple method of attaching supports is needed. Current art has a flat edge on downstream side of teardrop shape. The flat downstream sharp edge does not provide optimum improvement of flow resistance as a smooth transition.

Collected debris can be removed from the bar screen by passing a scraper or a rake over the upstream side of the bars, pulling the debris to the surface for disposal. Scrapers are flat plate with a flat side against the bars. A scraper may have shaped serrations to better remove surface debris. Debris that is small enough to not be stopped at the bar upstream surface, but does not penetrate completely through the bar space needs to be removed. Prior art are flat plates with multiple narrow projections, called tines, penetrating the bar spaces to remove debris from between the bar spaces.

Capturing small debris in the liquid stream requires small bar spacing. To not excessively reduce the flow area narrow bars are used. Narrow bars are weaker than wider bars, and are subject to damage from large debris. Bars in typical bar screens are permanently affixed in sections or as an entire unit. Replacing one or two damaged bars is impossible.

DISCLOSURE OF THE INVENTION

The present invention provides a new and improved screening or filtering apparatus of the type that includes bar screens which are used to collect debris from channeled water flowing into water treatment plants, industrial sites, drainage facilities or overflow control facilities. An example of the type of apparatus, to which this invention pertains is disclosed in U.S. Pat. No. 5,425,875, (the '875 patent), which is hereby incorporated by reference.

The apparatus of the present invention includes a bar screen assembly that comprises a plurality of spaced apart, elongate bars arranged in a parallel relationship, each bar having an upstream edge and a downstream edge. Each bar has distal ends to which metal clips are attached. The clips are used to mount the filter or screening bars to cross member supports. The clips preferably include a V portion which is suitably attached to an associated bar, as by welding. The clip also includes a cross member engaging portion which is receivable by a suitably shaped opening defined by the cross member. In the illustrated embodiment, the cross member opening is a slot that receives the cross member engaging portion of the clip.

In the preferred and illustrated embodiment, the clips are U-shaped and include the bar engaging portion and a U-shaped cross member engaging portion. In the preferred and illustrated embodiment, the U-shaped cross member engaging portion is receivable by a complementally-shaped opening in the associated cross member. The clips are operative to space the trailing edge of a bar, a predetermined distance from an associated cross member. A clamping member maintains the engagement of the bars with the associated cross members.

The apparatus further includes a continuous conveyor for carrying a plurality of rakes, which, in operation, move along the bars of the bar screen assembly in order to remove debris. According to the invention, a rake comprises a plate having a plurality of spaced apart tines, the spacing of the tines being related to the spacing of the plurality of bars that comprise the bar screen assembly. The rake is arranged such that the tines fit between the bars as the rake plate is moved along the bars by the conveyor, thereby removing debris from the bar screen assembly. The tines of the rake have a length such that the tines span the distance between the leading edge and trailing edge of a bar. In one illustrated embodiment, the rake tines extend beyond the trailing edge or back of an associated bar as the rake is moved along said plurality of bars.

According to the feature of the invention, the U-shaped portions of the clips frictionally engage associated openings in a cross member. According to a further feature of this embodiment, at least one of the clamping members engages steps formed on first clips that are located at a first distal end of the bars. According to another feature of this embodiment, the other clamping member engages the leading edges of the bars located near a second distal end of the bars. With the disclosed invention, clamping members are easily removable in order to replace a bar in the bar screen assembly.

In the illustrated embodiment, the continuous conveyor also carries a plurality of scraping plates that are spaced from the rakes. In the preferred and illustrated embodiment, the clips are made from sheet metal and the bar engaging portions of the clips are welded to an associated bar.

In a more preferred embodiment of the invention, the bars that comprise the bar screen assembly, each have first and second distal ends to which first and second U-shaped clips are attached. Each of the clips have a bar engaging portion and a U-shaped portion, the U-shaped portions of the clip being receivable by complementally-shaped openings in associated first and second cross members. The clips are operative to space the trailing edge of each bar a predetermined distance from an associated cross member. In this embodiment, the first clip that is attached to the first distal end of the bar defines a step which is engageable by a first clamping member that engages the step in order to maintain the clip in its operative position on the associated cross member. According to this embodiment, the first clip is Z-shaped. With this construction, the first clamping member does not pose an obstruction to the movement of the rake along the bar screen. In the preferred embodiment, each clip includes a V-shaped portion which is configured to receive the trailing edge of an associated bar.

With the disclosed invention, efficient and thorough cleaning of the bars is assured. The rake tines that pass through the space between the bars extend from the leading edge to at least the trailing edge or back of the bars. In one illustrated embodiment, at least some of the tines extend beyond the trailing edge or back of the bars. As a result, thorough cleaning of debris from the bars is realized.

In the preferred embodiment, the U-shaped sections of the clips, which are received by complementally-shaped openings in the associated cross members, allow the bars to be easily replaced. In addition, the U-shaped configuration results in a frictional engagement between a clip and its associated slot. The relatively tight engagement is realized even if a given bar has deviations, i.e., slight bends, warping, etc. The U-shaped sheet metal clips can deform slightly in order to accommodate slight bar defects.

According to the invention, a bar screen is provided in which the screening or filtering bars are mounted in such a way, that the tines or prongs of a rake can extend the full width of a bar, i.e., from the upstream to the downstream edges of the filtering bars and beyond.

According to the invention, the downstream edges of the filtering bars are attached to a lateral or cross support members using clips or saddles which allow the cross members that support the bars to be spaced substantially away from the downstream edges of the filtering bars, thus providing clearance for the tips of the rake tines as the rake moves along the bars.

According to one embodiment of the invention, the tines of the rake extend beyond the downstream edges of a filtering or screen bar. As a result, full penetration of the spacing between the bars is achieved, resulting in much better removal of accumulated debris which includes debris trapped between adjacent screen bars.

According to an additional feature of the invention, intermediate supports for the bars may be provided by intermediate clips, which may be the same or substantially similar to the clips that are used to support the distal ends of the bars. The intermediate clips are received in suitably shaped openings of an intermediate cross member which, in the illustrated embodiment, are slots.

Additional features of the invention and a fuller understanding will be obtained by reading the following detailed description in conjunction with the accompanying drawings.

DESCRIPTION OF THE PREFERRED EMBODIMENT

Figure 1A:
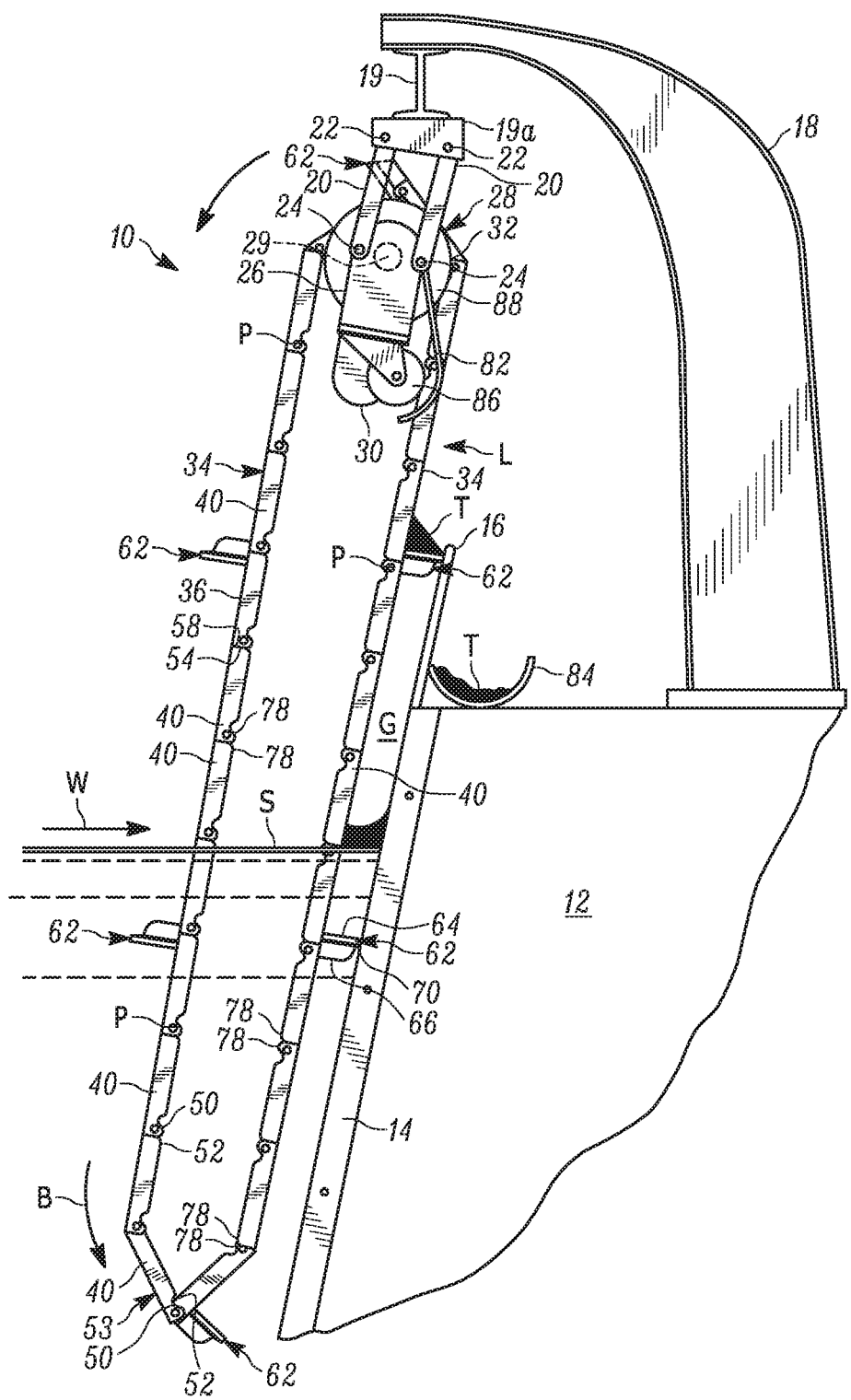
FIG. 1A is a side elevational view of a prior art screening/filtering apparatus.

FIG. 1A illustrates a prior art bar screen which includes a screen scraper. The prior art bar screen is fully disclosed in U.S. Pat. No. 5,425,875, which is hereby incorporated by reference.

The prior art apparatus is indicated generally by the reference numeral 10 and is shown in the drawing as being installed in a flowing stream of water S. Upstream of the filtering apparatus includes a screen or grid 14 having a plurality of rods or bars 16 that are spaced from one another a distance sufficient to enable water to flow freely through the screen, but block the passage of debris that could damage a downstream pump, (not shown), located in a pump house 12. As illustrated in FIG. 1A, the upstream side of the screen 14 is generally upright and planar, but inclined to the vertical upwardly and in the direction of flow W.

The screen cleaning apparatus 10 comprises a pair of spaced apart, upstanding supports 18 mounted atop the pump house 12 and supporting a horizontal cross beam 19. The cross beam 19 is provided with angled mounting brackets 19a which mount a pair of parallel hanger arms 20 of equal length. Each hanger arm is pivoted at its upper end to the associated bracket as at 22 and at its lower end by a pin 24 to a housing or carriage 26 which provides support for a rotary drum 28. The drum 28 has a rotary shaft 29 defining an axis of rotation and journaled at its ends by the carriage 26. The drum is rotated in the direction of arrow A by an electric motor 30 and a sprocket chain drive assembly 31 carried by the housing 26.

The shaft 29 has fixed thereto an identical pair of spaced apart sprockets 32 around each of which is trained an endless chain 34 of identical construction. Each chain forms a closed loop L having upward and downward flights or runs 36, 38, respectively, that are generally linear and approximately parallel and drivingly coupled to the sprockets 32 as will be described in greater detail below.

Each chain 34 includes a plurality of elongate, rigid bar links 40 that are joined end-to-end by pivot connections P constructed to limit relative movement of the links in one direction only from a position in which the links are in linear prolongation of each other.

Knuckle joints permit two adjacent links 40 to pivot freely relatively to one another in one direction only (see the arrow B in FIG. 1) from a position in linear prolongation of one another. Such pivotal movement is limited by engagement between first abutment surfaces 50, 52 on each adjacent pair of links and so positioned as to engage one another when the links are moved to an extreme position.

The interleaved relationship between the parts of the knuckle joints 42, coupled with the abutments on opposite sides of each projection 44, ensures that two adjacent links can pivot in only one direction from the position of linear prolongation. Consequently, the downward run 36 may transition at the bottom 53 of the loop L to the upward run without any drum or other device being located between the runs at the bottom of the loop. Thus, the lower transition or bottom of the loop is vertically movable. The bottom of the loop normally is at a level below the surface of the stream S.

A plurality of scraper blades 62 is detachably connected to the chains 34 at longitudinally spaced intervals for movement with the chains.

In the operation of the apparatus 10 as thus far described, the drum 32 is rotated in the direction of arrow A so that the downstream chain flight or run 38 moves upwardly at a low rate of speed. Due to the inclination of the screen rods 16 and the relative positioning of the drum 32, the free edge 70 of each successive scraper blade 64 is urged by gravity and stream flow against the screen rods 16 so as to scrape material off the screen rods 16 and carry such material upwardly. As each successive scraper blade 64 begins to make the turn around the drum 32, it will assume a vertical position at a point in the turn that is downstream, i.e., to the right, of the rotary shaft 29, thereby enabling debris supported by such blade to fall by gravity into a deflecting shield 82 which deflects the debris toward a receiver or trough 84 mounted atop the pump house 12. The receiver 84 may be fitted with an auger or other device (not shown) for moving the material out of the receiver for disposal.

Figure 1B:
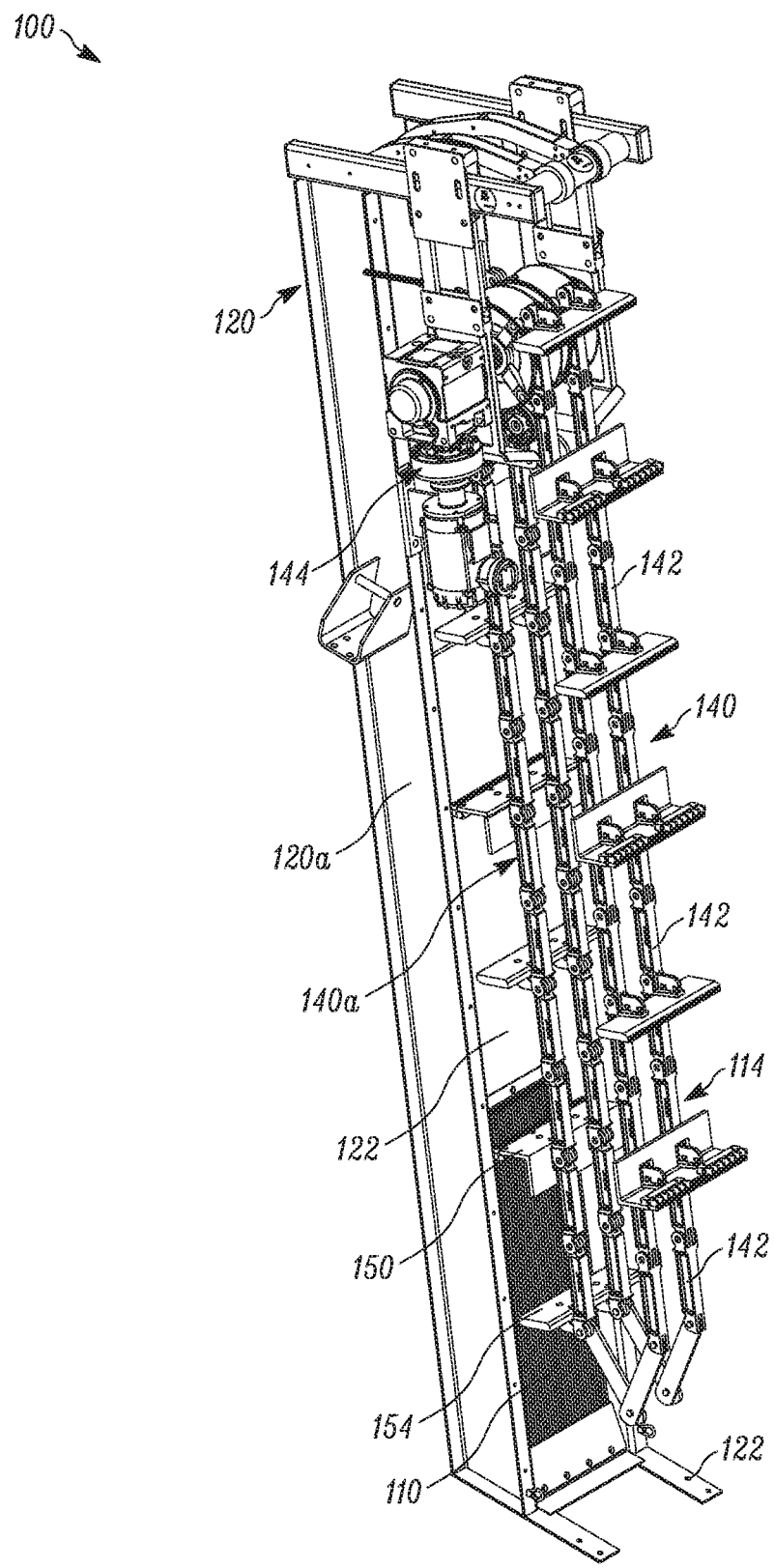
FIG. 1b is a perspective view of a headworks bar screen machine that includes a bar screen assembly constructed in accordance with the preferred embodiment of the invention.

FIG. 1B illustrates the overall construction of an improved bar screen machine 100 that includes a bar screen assembly 110 and an articulated bar screen cleaning apparatus 114 constructed in accordance with a preferred embodiment of the invention. For some applications, the machine may be referred to as a headworks. The filtering/screening apparatus or machine 100 shown in FIG. 1B is typically placed at the intake of a wastewater treatment facility or a municipal water treatment facility and filters or screens the incoming water stream to remove debris, etc., which could damage downstream pumps if the debris were allowed to enter a pump intake (not shown).

It should be noted here that the terms "filter" and "screen", as well as "filtering" and "screening" shall be used interchangeably in this description. As indicated above, the machine 100 includes, what the industry terms as a "bar screen". The term "screening" implies a device or filter that is intended to block large debris. In any event, a "bar screen" does perform a "filtering" function, and, therefore, the terms "filter and "screen" will be used interchangeably in this description.

The improved head works bar screen 100 includes a frame indicated generally by the reference character 120 which includes a pair of upstanding frame members 120a and which extends upwardly from a base or feet 122 by which the filtering machine 100 is rigidly attached in its operative position. Typically, the filtering machine 100 would be mounted within a channel or duct that conveys the water to be treated to the downstream pumps (not shown).

According to the invention, the machine 100 includes the bar screen assembly 110 at its lower end. The bar screen assembly 110, which includes a plurality of spaced apart parallel bars is mounted between the frame members 120a (only one is shown) in FIG. 1B. Depending on the depth of the incoming water stream, the bar screen 110 may extend upwardly, a further distance than that shown in FIG. 1B. The vertical extent of the bar screen assembly 110 is determined by the water level in the channel or duct in which the filter apparatus is located. As seen in FIG. 1B, rigid plates 122, which may be termed "dead plates" are suitably mounted above the bar screen assembly 110 and prevent water from by passing the bar screen should the water level in the duct rise above the top of the bar screen assembly 110.

Figure 2:
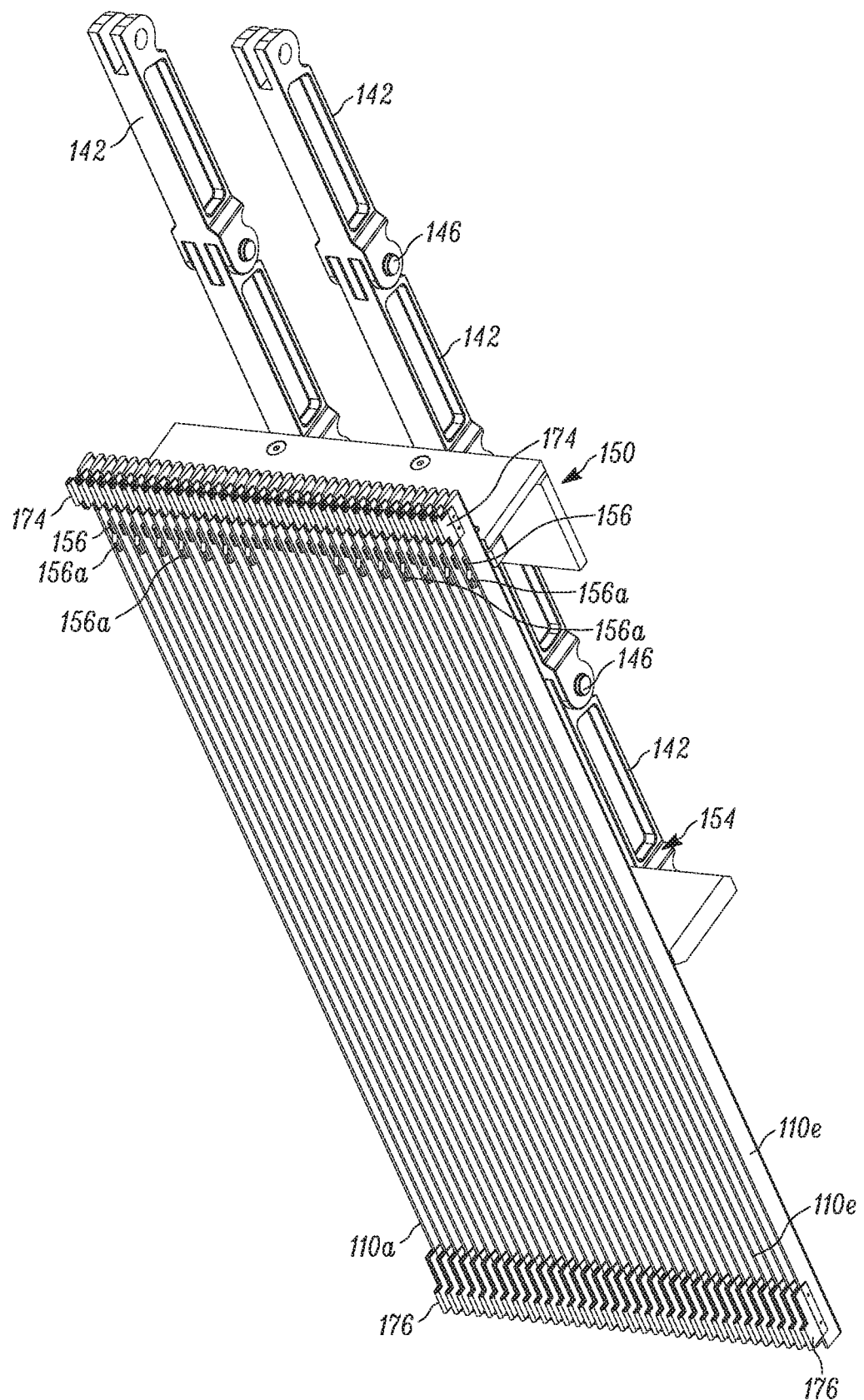
FIG. 2 is a fragmentary, perspective view of a bar screen assembly and a cleaning apparatus constructed in accordance with a preferred embodiment of the invention.

As also seen in FIG. 1B, a continuous conveyor, indicated generally by the reference character 140, is formed by pivotally interconnected bar links 142 which may be conventional. The conveyor 140 is driven by a conventional electric motor and sprocket/sprocket assembly indicated generally by the reference character 144. The inner run 140a of the conveyor, i.e., the run immediately adjacent the bar screen assembly 110, moves upwardly, as viewed in FIG. 1B. Referring also to FIG. 2, the conveyor carries a plurality of spaced apart rake plates 150 and scraper plates 154. As seen best in FIG. 1B, both the rake and scraper plates 150, 154 engage the bar screen assembly 110, thereby removing any debris or trash from the bar screen assembly. The debris captured and engaged by the rake plate 150 and scraper plate 154 moves upwardly (as viewed in FIG. 1B). A seen in FIG. 1A, the captured debris or trash T is discharged or dumped into a conventional trash receptacle 84

Figure 3:
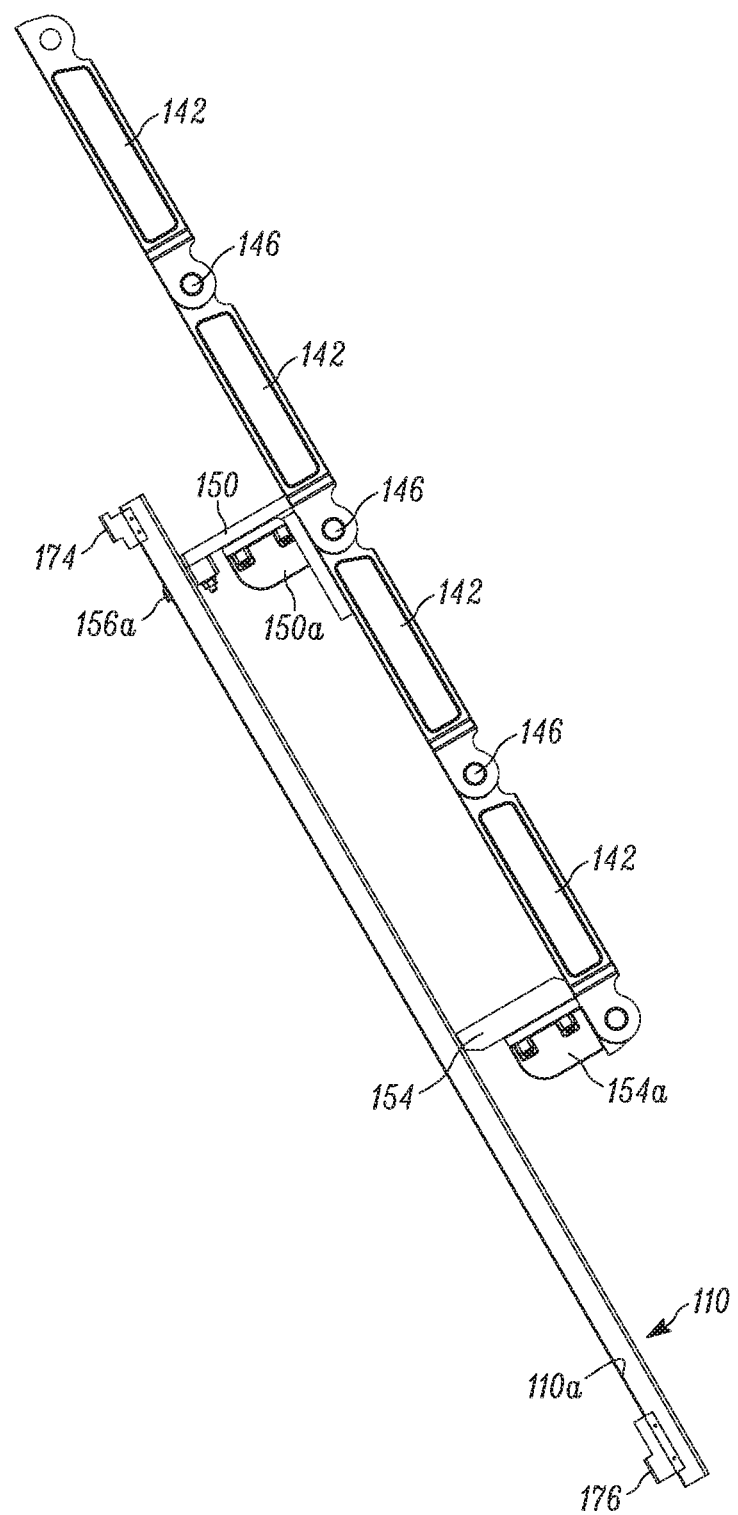
FIG. 3 is a side elevational view of the bar screen assembly and cleaning apparatus shown in FIG. 2.
Figure 4:
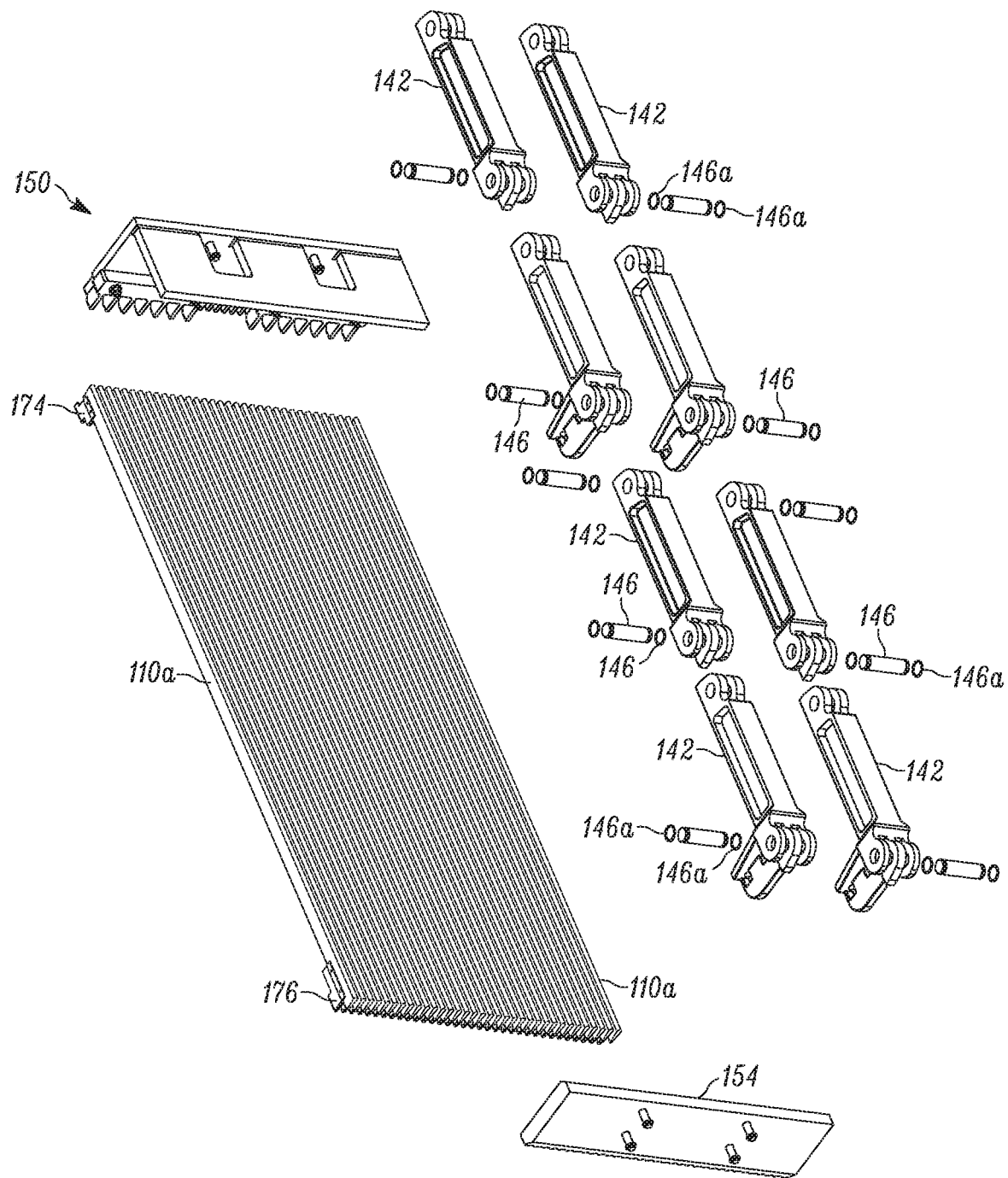
FIG. 4 is an partial exploded view of the bar screen assembly and cleaning apparatus shown in FIG. 2.

Referring also to FIGS. 3 and 4, the relationship of the bar screen assembly 110, the rake plate 150 and the scraper plate 154 are shown. As seen best in FIG. 3, the rake plate 150 is suitably attached to a bracket 150a that is carried by the bar link conveyor 140. The scraper plate 154 is similarly attached to a bracket 154a also carried by the bar link conveyor 140. It should be noted here that the bar links 142 that comprise the conveyor 140 may be conventional and are arranged so that two interconnected bar links 42 can only rotate in one direction relative to each other. Details of the bar link interconnection and the mounting brackets for the rake plates and scraper plates are shown in FIG. 4. A seen in FIG. 4, the individual bar links 142 that comprise the conveyor 140 are interconnected by pins 146, which include locking clips 146a for maintaining the position of the pins 146 once installed.

Figure 5:
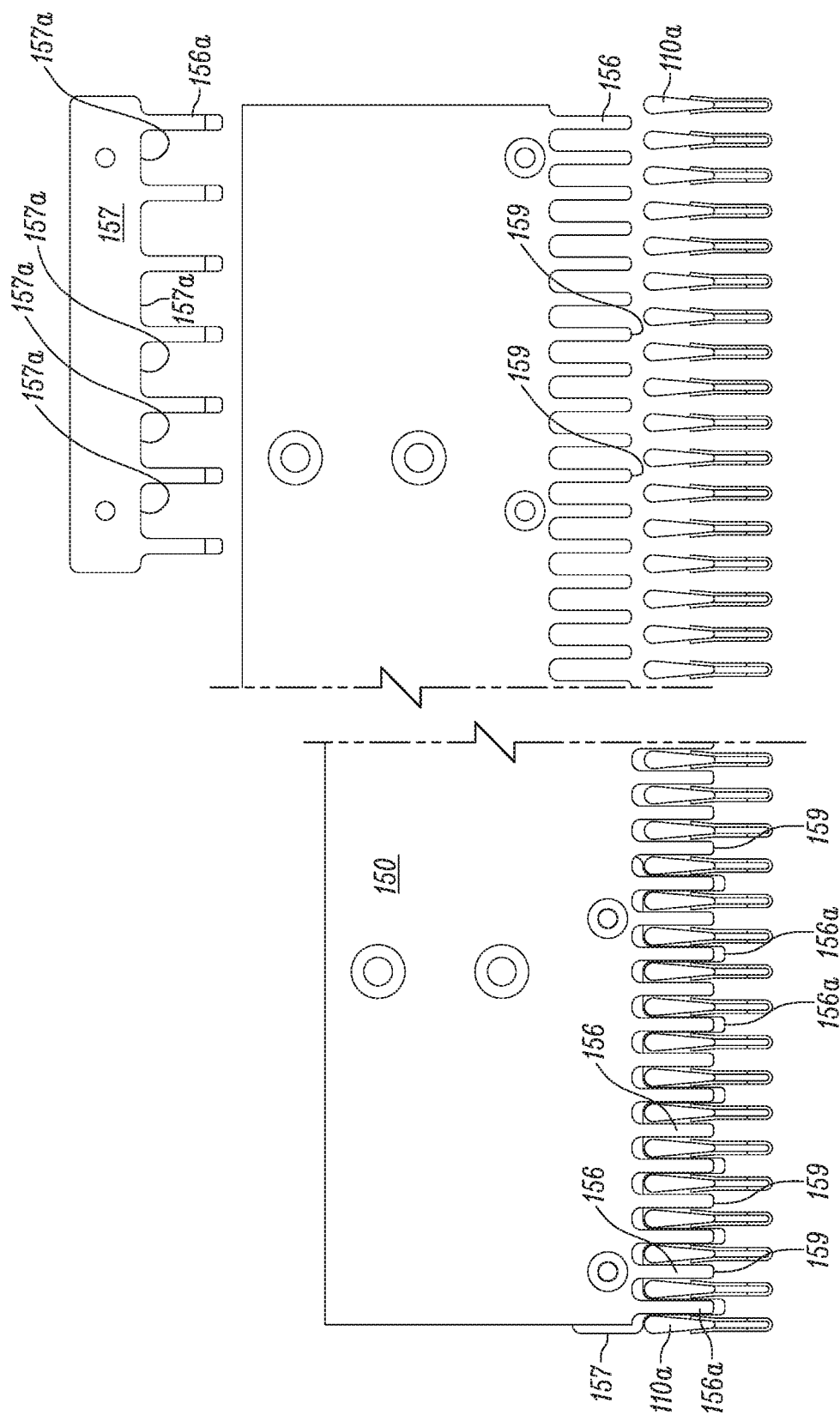
FIG. 5 is an elevational view of a rake plate.

FIG. 5 illustrates the preferred construction of the rake plate 150. As seen in FIG. 5, the rake plate 150 mounts a plurality of preferably equally spaced tines 156. The spacing of the tines 156 corresponds to the spacing of the filter or screen bars 110a. In the preferred and illustrated embodiment, certain tines, such as 156a, have a longer dimension and are constructed of a "softer" or polymer material so that when the scraper plate 150 exits the top of the bar screen 110 and begins riding against the dead plate 122, the longer, softer tines contact the surface of the dead plates 122, rather than the tips of the shorter, but harder, rake tines, thus reducing the chance of galling the dead plate 122 as the rake plate 150 moves upwardly. In the illustrated embodiment, the tines 156a are part of an additional plate 157 that is bolted to the rake plate 150.

Figure 6:
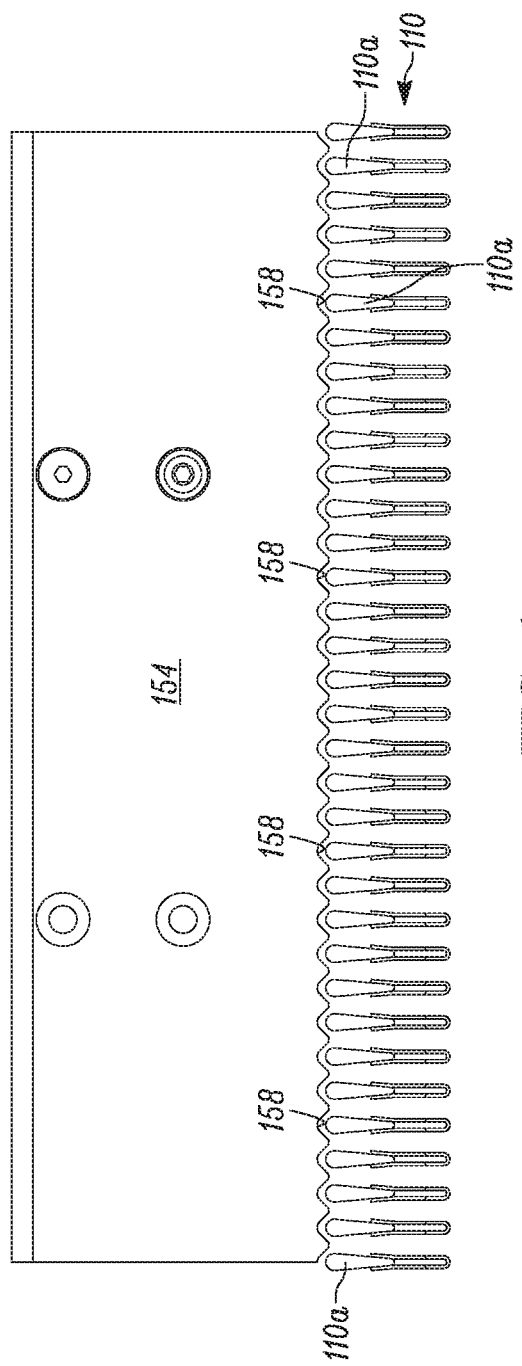
FIG. 6 is a side elevational view of a scraper plate.

As seen in FIG. 6, the scraper plate 154 includes notches 158 which are configured to conform tightly with the top or upstream surface of the bar screen bars 110a. In other words, the profile of the notches 158 preferably match the profile of the upstream edge of the filter bars.

Figure 7:
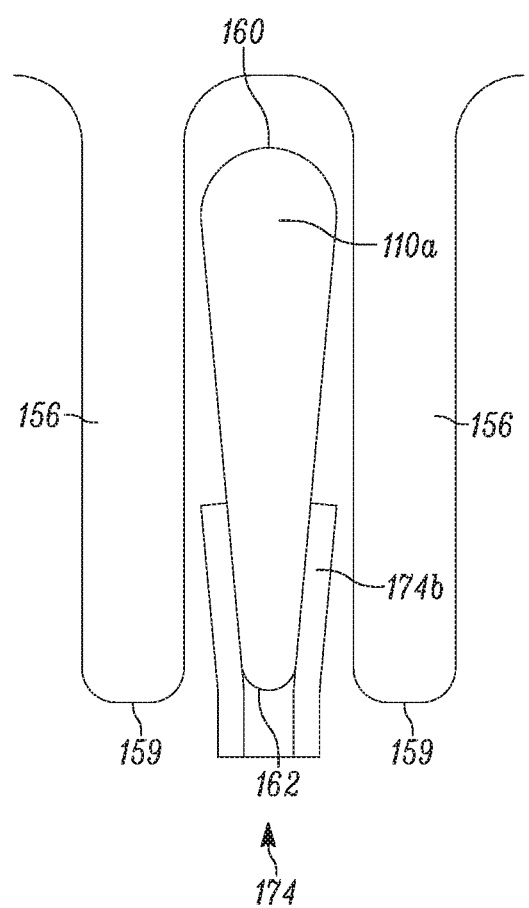
FIG. 7 is a fragmentary view showing the relationship between the tines of a rake plate and a filter or screening bar.

According to the preferred embodiment and best shown in FIG. 7, and unlike the prior art, the tines 156 of the rake plate 150 extend from the leading edge 160 to the trailing edge 162 of each associated filter bar 110a. According to the invention, the tips 159 of the rake tines 156 extend at least to the trailing edge 162 of the filter bars. In other words, according to the invention, as the rake 150 moves across the filter bars, the tips 159 of the rake tines are at least substantially flush with the trailing edge 162. As seen in FIG. 7, however, the present invention contemplates rake tines 156 having tips 159 which extend beyond the trailing edge 162 of the filter bars. As noted above, the rake plate also mounts longer, polymer rake tines 156a which extend further beyond the trailing edges 162 of the filter bars. The present invention does contemplate the tips of both the metal tines 156 and the polymer tines 156a to extend beyond the trailing edges 162 of the bars. The relationship between the rake tines 156 and a filter bar 110a is shown in FIG. 7. In the embodiment shown in FIG. 7, the tines 156 of the rake 150 have a length that is greater than the transverse dimension of a filter or screen bar 110a.

Referring to FIG. 5, additional details of the rake plate and polymer tines will be described. In the preferred and illustrated embodiment, the rake plate 150 and the tines 156 are made from stainless steel. The dead plates 122 (shown in FIG. 1b) are also preferably constructed from stainless steel in order to resist corrosion. In the preferred and illustrated embodiment, the polymer tines 156a form part of a polymer plate 157 which is suitably bolted to the rake plate 150. According to the preferred embodiment, the polymer plate 157 defines a bearing surface 157a between the polymer tines 156a. According to this embodiment, the bearing surfaces 157a ride atop or slidingly engage the leading edge 160 of the screen bars 110a. With this configuration, steel-to-steel contact between the rake plate and the upstream edges of the bars is inhibited. According to this feature, as the bearing surface 157a wears, the rake plate 150 moves downwardly (as viewed in FIG. 5), thus causing the stainless steel tines 156 to move deeper with respect to the bars 110. In normal operation, the tips 159 of the tines 156 will eventually extend beyond the trailing edge 162 of the filter bars, as shown in FIG. 7. According to this feature of the invention, when the machine is assembled, the tines 156 will extend such that the tips 159 of the tines 156 are substantially flush with the trailing edge 162 of the screen bars 110. Over time, however, the tines 156 will penetrate further into the bar screen and, in most instances, the tips 159 of the tines 156 will eventually extend beyond the trailing edges 162 of the screen bars 110 as shown in FIG. 7.

Figure 8:
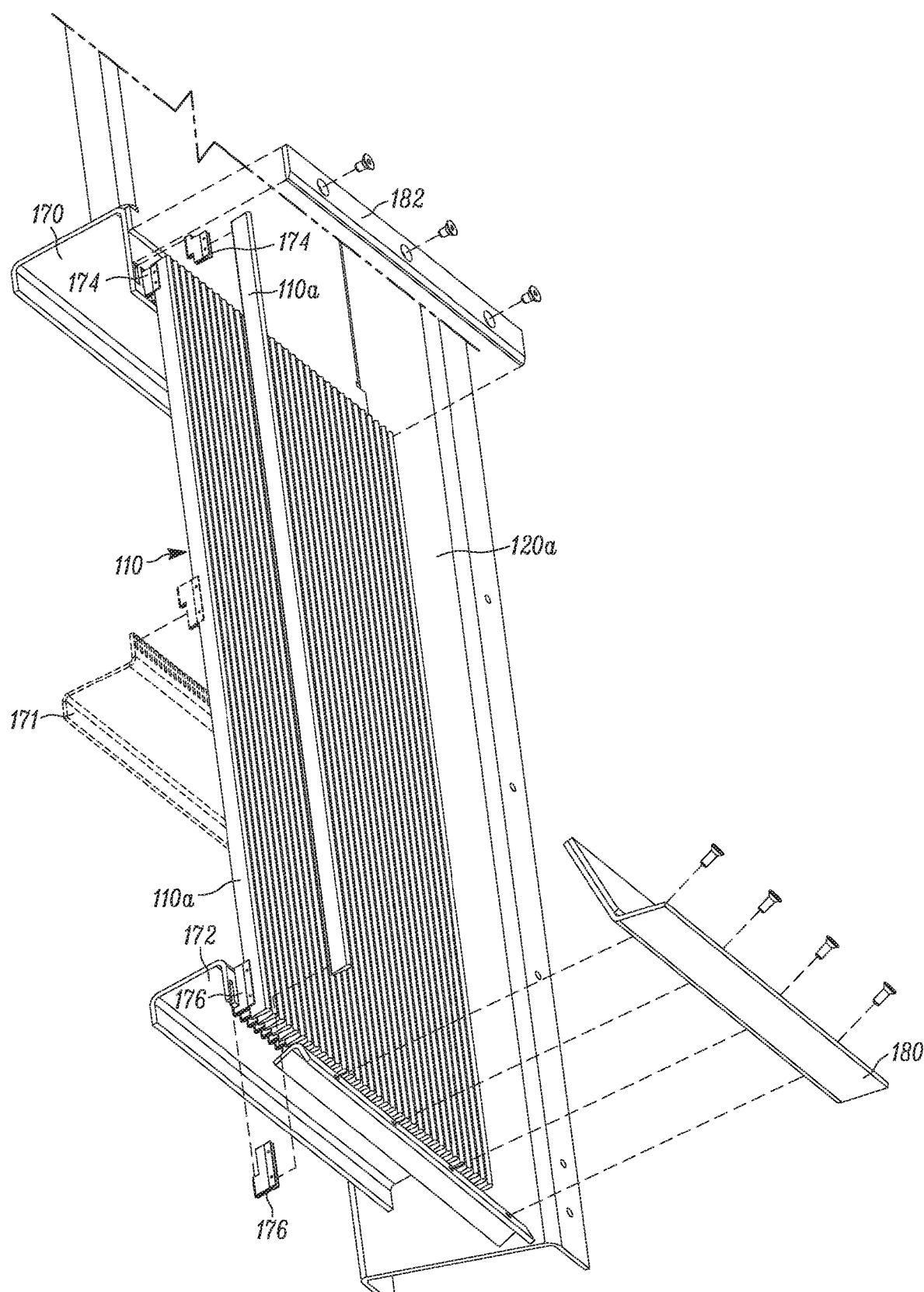
FIG. 8 is a partial exploded view of the bar screen assembly.
Figure 9:
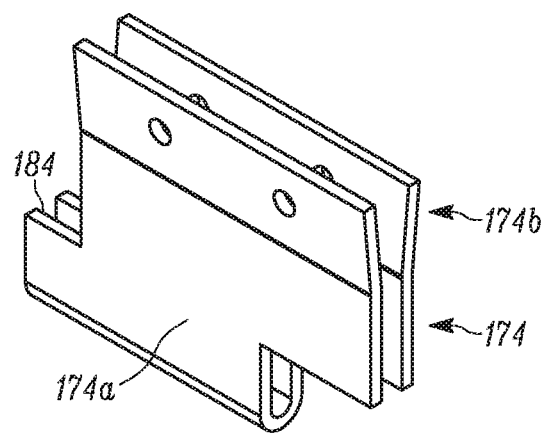
FIGS. 9 and 10 are perspectives views of clips or saddles constructed in accordance with a preferred embodiment of the invention and which support the operative positions of the filter or screening bars.
Figure 10:
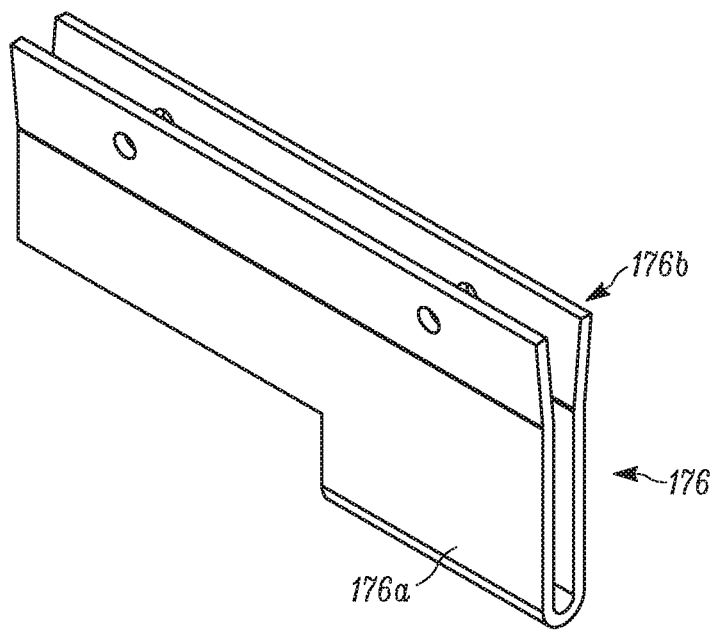
Figures 12, 13:
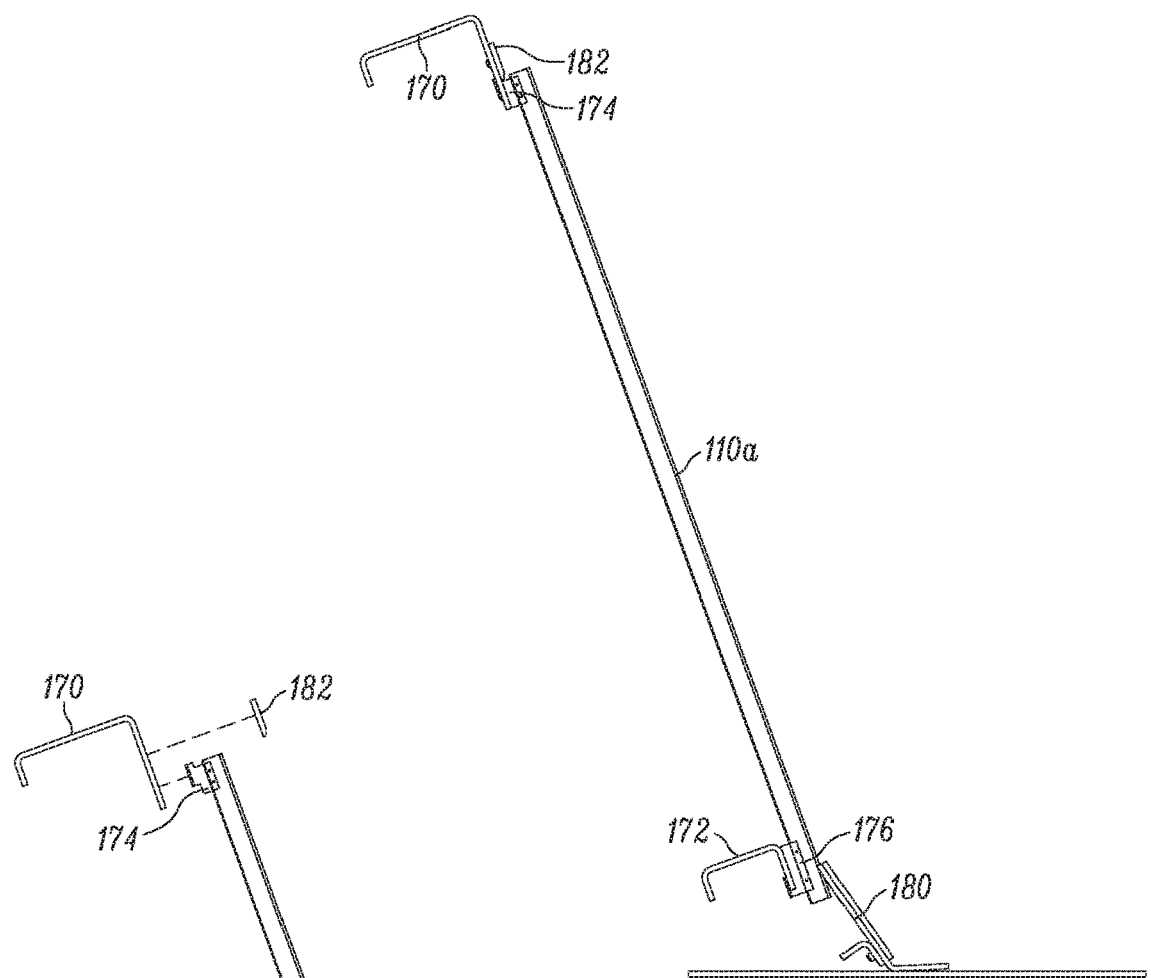
FIG. 12 is a fragmentary, side elevation view showing the mounting of a filter bar.
FIG. 13 is a fragmentary, exploded view of the screen bar and mounting shown in FIG. 12.

According to the invention, the filter bars 110a are mounted using clips or saddles which space the trailing edges 162 of the bars 110a from any cross members or cross pieces that would otherwise interfere with the movement of the rake fingers or tines 156 as they move along the bar screen 110. As seen in FIGS. 8, 12 and 13, each individual bar 110a is mounted to upper and lower, C-shaped channels 170, 172 using respective upper and lower mounting clips 174, 176. The C-shaped channel 170, 172 are suitably attached to the frame members 120a as by welding. Referring also to FIG. 10, an L-shaped mounting clip 176 is suitably attached to a lower region of each filter bar 110a. The clip may be fastened to the bar by welding or by a separate fastener. Referring also to FIG. 9Z-shaped clip 174 is attached to the upper end of each filter bar 110a. The details of the upper and lower clips 174, 176 are best shown in FIG. 9 and FIG. 10. The clips are similar in construction. Each clip is preferably made from sheet metal that is bent into a general U-shape. As will be explained, the respective bottom, U-shaped sections 174a, 176a, as viewed in FIGS. 9 and 10 are received in a complementally shaped slots formed in the associated cross member. An upper section 174b, 178b of each clip 174, 176, as viewed in FIGS. 9 and 10, includes a bent, a somewhat V-shaped section 174b, 176b, which is adapted to receive the trailing edge 162 of each bar 110a and is suitably fastened thereto, i.e., either by welding or separate fasteners. As seen best in FIG. 14, the use of these clips 174, 176 for mounting the individual bars 110a of the bar screen 110, cause the trailing edges 162 of the bars 110a to be spaced away from the supports 170, 172 thus providing clearance for the tines 156 of the rake plate 150, so that the tines can extend from the leading edge 160 to the trailing edge 160 of each bar 110a and beyond. With the present invention, debris that is lodged anywhere along the side surface of a bar or bars 110a can be removed by the rake plate 150.

Referring to FIGS. 12 and 13, the bottom ends of the filter bars 110a are clamped to the associated cross member by a removable clamping plate 180 which engages the lead edges of the filter bars 110a and which prevents the lower ends of the filter bars 110a from moving out of the slots that hold the associated mounting clips 176.

Figure 11:
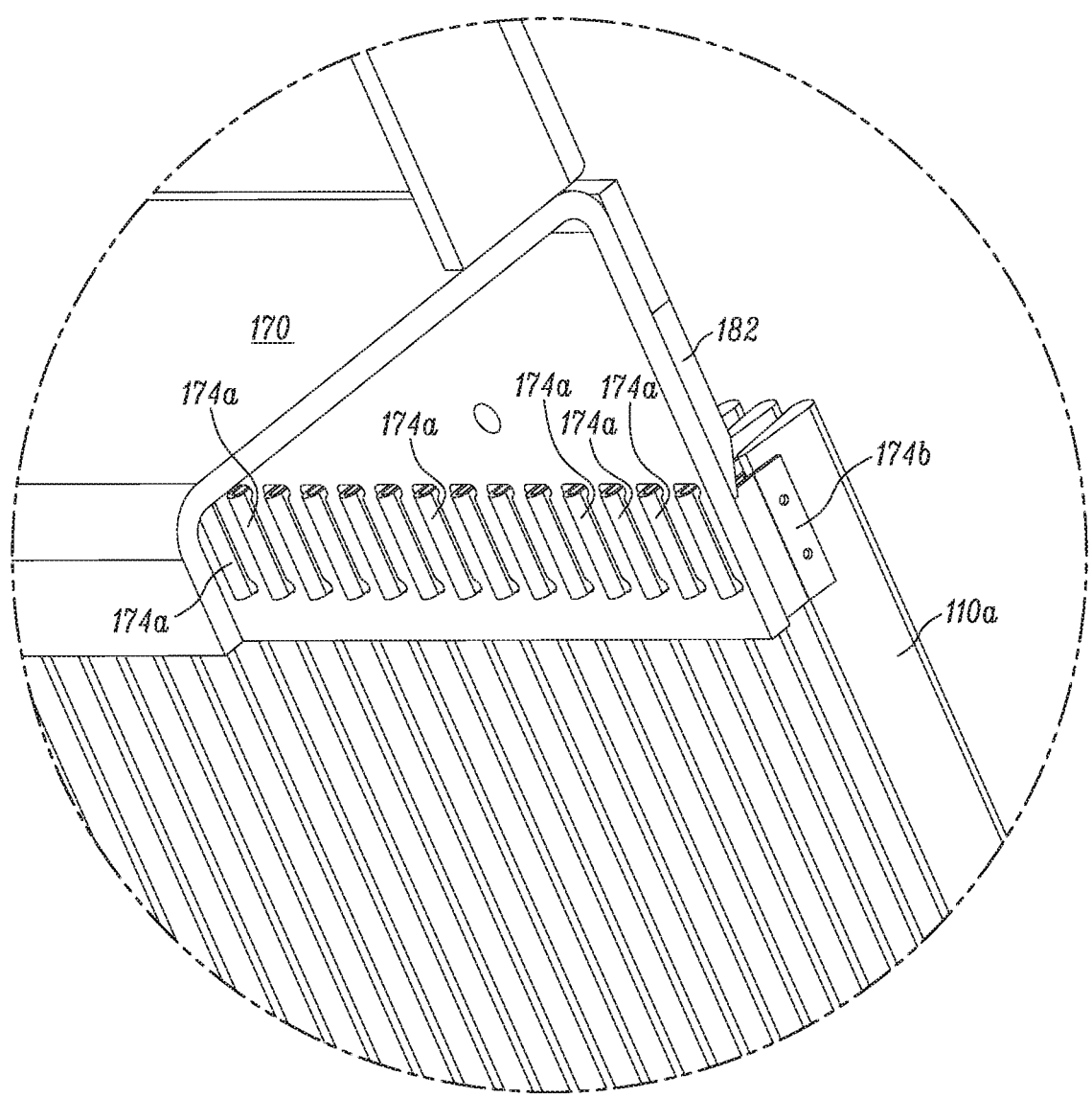
FIG. 11 is a fragmentary, perspective view showing mounting of the screen bars.

Referring also to FIG. 11, the upper end of the individual bars 110a are held to the upper cross member 170 by a removable clamping plate 182 which clamps an extending portion or shelf 184 of the U-shaped section 174a of the upper clip 174 shown best in FIG. 90. The clamping plate or toe bar 182 maintains the position of the clips 174 in the slots 170a of the upper cross member 170 (shown best in FIG. 11), thus securing the position of the filter bars 110a. With the disclosed construction, the filter bars 110 are rigidly held by the associated cross members 170, 172, but are easily replaced, if replacement is necessary.

Figure 14:
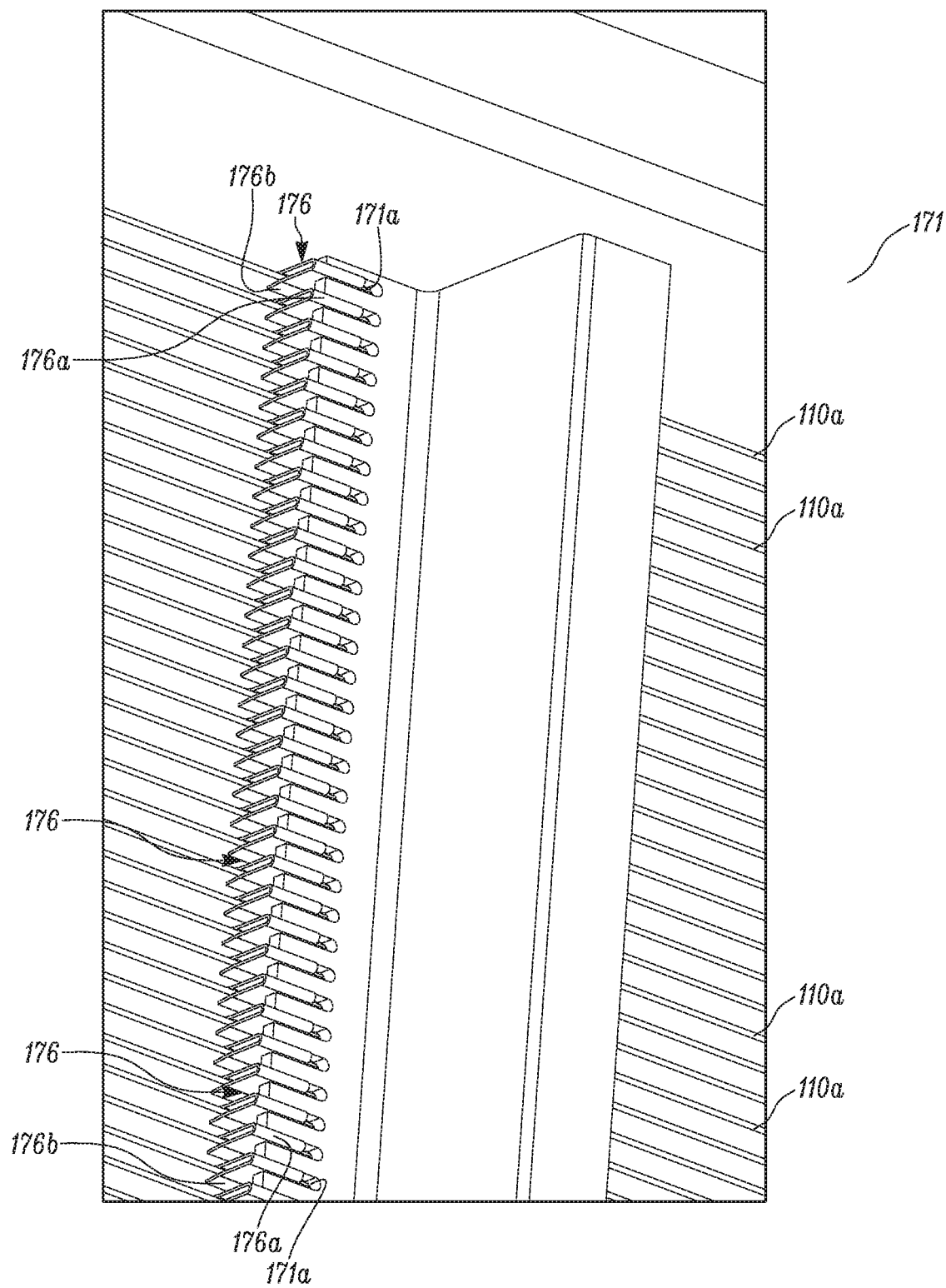
FIG. 14 is a fragmentary perspective view of an optional intermediate support for the screen or filter bars.

FIG. 14 illustrates an optional feature of the present invention. In particular, FIG. 14 illustrates an intermediate support for supporting the screen bars 110a in an intermediate location, i.e., between the upper and lower distal ends (as viewed in FIG. 8). As seen best in FIG. 14, this optional feature includes an intermediate cross member 171 which is also attached to the frame members 120a as by welding. The cross member 171 includes slots 171a, which are adapted to receive U-shaped portions of intermediate clips 176. The clips 176 may be the same or similar to the clips 176 (shown in FIG. 10). The clips 176 include a V-shaped portion 176b that is secured to the trailing edge of the filter bars 110a. This supplemental support, shown in FIG. 14, is intended to be used in bar screen constructions that use extremely long filter bars 110a. The intermediate support helps maintain the parallel alignment of the filter bars 110a and resists bending of the bars in the transverse direction, which would change the spacing of the bars. The support also resists bending of the bars in the waterflow direction as the rake and scraper plate move across the bars.

It should be noted here that in the preferred embodiment, the clips 174, 176 are metal and are formed into a U shape. The present invention, however, contemplates clips of different configurations. As an example, the present invention contemplates a metal clips that includes a V-shaped portion which is attached to the filter bar, as by welding, and a cross member engaging portion which is received by an associated cross member. The cross member engaging portion need not be U-shaped, but instead, could be configured as a metal plate, which is received by a suitable shaped opening in a cross member such as a slot. The plate may include protrusions, dimples, etc., to create a frictional engagement between the cross member engaging plate portion and the slot in the cross member that receives the plate portion. In addition, the bar engaging portion need not be V-shaped, but instead could simply be a bent flange which is suitably attached to the associated bar, as by welding or by suitable fasteners. These variations are all contemplated by the present invention.

Although the invention has been described with a certain degree of particularity, it should be understood that those skilled in the art can make various changes to it without departing from the spirit or scope of the invention, as hereinafter claimed.

The invention claimed is:

1. An apparatus for removing debris from channeled water, comprising:
   a) a bar screen assembly including:
      i) a plurality of spaced apart, elongate bars arranged in a parallel relationship, each bar having an leading edge and a trailing edge;
      ii) each bar having distal ends to which support clips are attached;
      iii) each of said clips having a bar engaging portion and a cross member engaging portion, the cross member engaging portion being receivable by a complementally-shaped opening in an associated cross-member, said clips being operative to space the trailing edge of said bar a predetermined distance from associated cross members;
      iv) clamping members for maintaining engagement of said bars with said associated cross members;
   b) a continuous conveyor for carrying a plurality of rakes, each rake, including:
      i) a plurality of spaced apart tines, the spacing of said tines related to the spacing of said plurality of bars such that said tines can fit between said bars as said rake is moved along said bars by said conveyor, thereby removing debris from said bar screen assembly;
      ii) the tines of said rake having a length such that the tines span a distance between said leading edge and trailing edge of a bar so that tips of said rake tines extend to at least the trailing edge of an associated bar as said rake is moved along said plurality of bars.

2. The apparatus of claim 1 wherein the tines of said rake have a length that spans a distance that is greater than the distance between said trailing edge and leading edge of said bar and said tips of said tines extend beyond the trailing edges of said bar.

3. The apparatus of claim 1 wherein said cross member engaging portion is U-shaped and frictionally engages a slot formed in said associated cross member.

4. The apparatus of claim 1 wherein said bar engaging portion is V-shaped.

5. The apparatus of claim 1 wherein at least some of said support clips include a clamping surface engageable by at least one of said clamping members.

6. The apparatus of claim 5 wherein said other clamping members engage the leading edges of said bars near their associated distal ends.

7. The apparatus of claim 1 wherein said continuous conveyor also carries a plurality of scraping plates that are spaced from said rakes.

8. The apparatus of claim 1 further including intermediate clips for supporting an intermediate section of said bars, said intermediate support clip having a bar engaging portion and a cross member engaging portion, the cross member engaging portion being receivable in an opening in an intermediate cross member.

9. An apparatus for removing debris from channeled water, comprising:
   a) a bar screen assembly including:
      i) a plurality of spaced apart, elongate bars arranged in a parallel relationship, each bar having an leading edge and a trailing edge;
      ii) each bar having first and second distal ends to which first and second U-shaped clips are attached;
      iii) each of said clips having a bar engaging portion and a U-shaped portion, the U-shaped portion being receivable by a complementally-shaped opening in an associated cross member, said clips being operative to space the trailing edge of said bar a predetermined distance from an associated cross member;
      iv) clamping members for maintaining engagement of said bars with said associated cross members;
   b) a continuous conveyor for carrying a plurality of rakes, each rake, including:
      i) a plurality of spaced apart tines, the spacing of said tines related to the spacing of said plurality of bars such that said tines can fit between said bars as said rake plate is moved along said bars by said conveyor, thereby removing debris from said bar screen assembly;
      ii) the tines of said rake having a length such that the tines span a distance between said leading edge and trailing edge of a bar so that tips of said rake tines extend to at least the trailing edge of an associated bar as said rake is moved along said plurality of bars.

10. The apparatus of claim 9 wherein said U-shaped portions of said first and second clips frictionally engage said associated openings in said cross member.

11. The apparatus of claim 9 wherein said first U-shaped clip defines a step that is engaged by one of said clamping members located at one distal end of said bars.

12. The apparatus of claim 11 wherein said other clamping member engages the leading edges of said bars near the other distal ends of said bars.

13. The apparatus of claim 9 wherein said U-shaped clips are made from sheet metal and said bar engaging portion is welded to an associated bar.

14. The apparatus of claim 13 wherein said first U-shaped chip includes a V-shaped portion adapted to receive the trailing edge of said associated bar.

15. The apparatus of claim 9 wherein said bar screen forms part of a headworks.

16. The apparatus of claim 9 wherein said first U-clip is Z-shaped and the second U-clip is L-shaped.

17. The apparatus of claim 9 wherein the tines of said rake have a length that is greater than the distance between said trailing edge and leading edge of said bar and said tips of said tines extend beyond the trailing edges of said bar.

18. An apparatus for removing debris from channeled water, comprising:
   a) a bar screen assembly including:
      i) a plurality of spaced apart, elongate bars arranged in a parallel relationship, each bar having an leading edge and a trailing edge;
      ii) each bar having distal ends to which U-shaped clips are attached;
      iii) each of said clips having a bar engaging portion and a U-shaped portion, the U-shaped portion being receivable by a complementally-shaped opening in an associated cross member, said clips being operative to space the trailing edge of said bar a predetermined distance from an associated cross member;
      iv) clamping members for maintaining engagement of said bars with said associated cross members;
   b) a continuous conveyor for carrying a plurality of rakes, each rake, including:
      i) a plurality of spaced apart tines, the spacing of said tines related to the spacing of said plurality of bars such that said tines can fit between said bars as said rake is moved along said bars by said conveyor, thereby removing debris from said bar screen assembly;

ii) the tines of said rake having a length such that said tines span a distance between said leading edge and trailing edge of a bar so that each rake tine extends to at least the trailing edge of an associated bar as said rake is moved along said plurality of bars.

19. The apparatus of claim 18 wherein said U-shaped portions of said clip frictionally engage said associated opening in said cross member.

20. The apparatus of claim 18 where at least one of said clamping members engages steps formed on said clips located on one distal end of said bars.

21. The apparatus of claim 19 wherein said clamping members are easily removable in order to replace a bar in said bar screen assembly.

22. The apparatus of claim 18 wherein said U-shaped clips are made from sheet metal and said bar engaging portion is welded to an associated bar.

23. The apparatus of claim 18 wherein the tines of said rake have a length that spans a distance that greater than the distance between said trailing edge and leading edge of said bar and said tips of said tines extend beyond the trailing edges of said bar.

24. The apparatus of claim 18 further including intermediate clips for supporting an intermediate section of said bars, said intermediate support clip having a bar engaging portion and a U-shaped cross member engaging portion, the cross member engaging portion being frictionally receivable in a suitably shaped opening in an intermediate cross member.

* * * * *